US010191242B2

(12) United States Patent
Palmeri

(10) Patent No.: US 10,191,242 B2
(45) Date of Patent: Jan. 29, 2019

(54) MOVEABLE MIRROR ASSEMBLY FOR ELECTRONIC DEVICE CASE

(71) Applicant: Scandit AG, Zurich (CH)

(72) Inventor: John Palmeri, Middletown, NY (US)

(73) Assignee: Scandit AG, Zurich (CH)

(*) Notice: Subject to any disclaimer, the term of this patent is extended or adjusted under 35 U.S.C. 154(b) by 419 days.

(21) Appl. No.: 14/948,975

(22) Filed: Nov. 23, 2015

(65) Prior Publication Data
US 2016/0077307 A1 Mar. 17, 2016

Related U.S. Application Data

(63) Continuation of application No. 14/218,732, filed on Mar. 18, 2014, which is a continuation-in-part of application No. 13/984,204, filed as application No. PCT/US2012/043184 on Jun. 19, 2012.

(60) Provisional application No. 61/794,629, filed on Mar. 15, 2013, provisional application No. 61/499,073, filed on Jun. 20, 2011.

(51) Int. Cl.
G02B 26/08 (2006.01)
G02B 7/182 (2006.01)
H04N 5/238 (2006.01)
H04N 5/225 (2006.01)

(52) U.S. Cl.
CPC ......... *G02B 7/1821* (2013.01); *H04N 5/2252* (2013.01); *H04N 5/238* (2013.01)

(58) Field of Classification Search
CPC .. H04N 5/2251; H04N 5/2252; H04N 5/2254; H04N 7/15; H04N 5/225; H04N 5/238; G02B 17/08; G02B 7/1821

USPC ....................................................... 359/225.1
See application file for complete search history.

(56) References Cited

U.S. PATENT DOCUMENTS

| D344,261 S | 2/1994 | Watanabe |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| 8,223,203 B2 | 7/2012 | Ohsumi et al. |
| D667,823 S | 9/2012 | Merenda |
| D670,278 S | 11/2012 | Hamann |

(Continued)

FOREIGN PATENT DOCUMENTS

| JP | 2004-032507 A | 1/2009 |
| KR | 1020020077090 A | 10/2002 |

(Continued)

OTHER PUBLICATIONS

International Search Report and Written Opinion for International Application No. PCT/US2012/043184 dated Feb. 27, 2013.

(Continued)

*Primary Examiner* — Euncha Cherry
(74) *Attorney, Agent, or Firm* — Wolf, Greenfield & Sacks, P.C.

(57) ABSTRACT

A moveable mirror assembly can be used in connection with a case for a portable electronic device. The assembly can include a mirror housing and a mirror positioned within the mirror housing to redirect light to a portable electronic device within the case. The assembly can also include a rotational member coupled with the mirror housing and the case.

18 Claims, 13 Drawing Sheets

(56) References Cited

U.S. PATENT DOCUMENTS

| | | | |
|---|---|---|---|
| D678,870 S | 3/2013 | Fathollahi | |
| D685,360 S | 7/2013 | Chen et al. | |
| D688,654 S | 8/2013 | Stevinson | |
| D698,772 S | 2/2014 | Merenda | |
| D710,343 S | 8/2014 | Chandler, Jr. et al. | |
| D710,346 S | 8/2014 | Smith et al. | |
| 8,798,453 B2 | 8/2014 | Lawton | |
| D716,285 S | 10/2014 | Chaney et al. | |
| D716,785 S | 11/2014 | White | |
| D717,287 S | 11/2014 | Macrina et al. | |
| D719,167 S | 12/2014 | Brown et al. | |
| D724,573 S | 3/2015 | Stevinson | |
| D726,701 S | 4/2015 | Stevinson | |
| D728,551 S | 5/2015 | Saeki et al. | |
| D732,011 S | 6/2015 | Stevinson | |
| D744,470 S | 12/2015 | Stevinson | |
| D748,085 S | 1/2016 | Merenda | |
| D754,114 S | 4/2016 | Curtis et al. | |
| D754,650 S | 4/2016 | Curtis et al. | |
| D759,004 S | 6/2016 | Stevinson | |
| D760,209 S | 6/2016 | Weng et al. | |
| D760,212 S | 6/2016 | Mao et al. | |
| D760,710 S | 7/2016 | Ozolins et al. | |
| D761,240 S | 7/2016 | Ozolins et al. | |
| D768,617 S | 10/2016 | Merenda | |
| D771,631 S | 11/2016 | Fitch et al. | |
| 2007/0116454 A1 | 5/2007 | Tsai | |
| 2009/0002797 A1 | 1/2009 | Kwong et al. | |
| 2010/0328420 A1* | 12/2010 | Roman | H04N 5/2251 348/14.08 |
| 2011/0043683 A1 | 2/2011 | Beach et al. | |
| 2011/0081946 A1 | 4/2011 | Sing | |
| 2013/0329115 A1 | 12/2013 | Palmeri | |
| 2014/0171150 A1 | 6/2014 | Hurst et al. | |
| 2014/0285913 A1 | 9/2014 | Palmeri | |
| 2015/0053765 A1 | 2/2015 | Powell et al. | |
| 2015/0220766 A1 | 8/2015 | Russell et al. | |

FOREIGN PATENT DOCUMENTS

| | | |
|---|---|---|
| KR | 1020060102957 A | 9/2006 |
| WO | WO 01/31893 A1 | 5/2001 |

OTHER PUBLICATIONS

[No Author Listed] Code ReaderTM 4405. Available at: http://www.codecorp.com/products.php?id=167. Dec. 4, 2015. 1 page.

[No Author Listed] Linea Pro Extreme Rugged Case. Available at: http://ipcprint.com/linea-pro-extreme-rugged-case.html. Dec. 4, 2015. 2 pages.

[No Author Listed] Mobile Imager. Available at: http://padloc.co/pages/mobile-imager. Dec. 4, 2015. 2 pages.

* cited by examiner

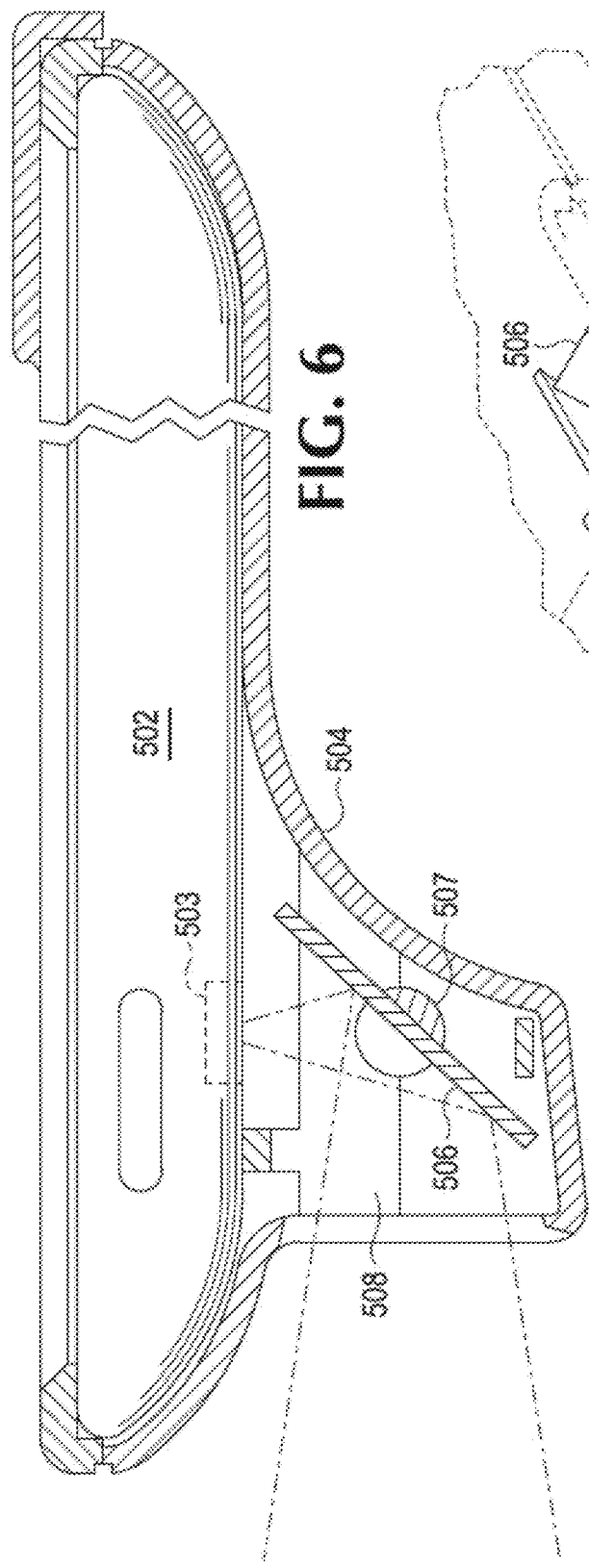
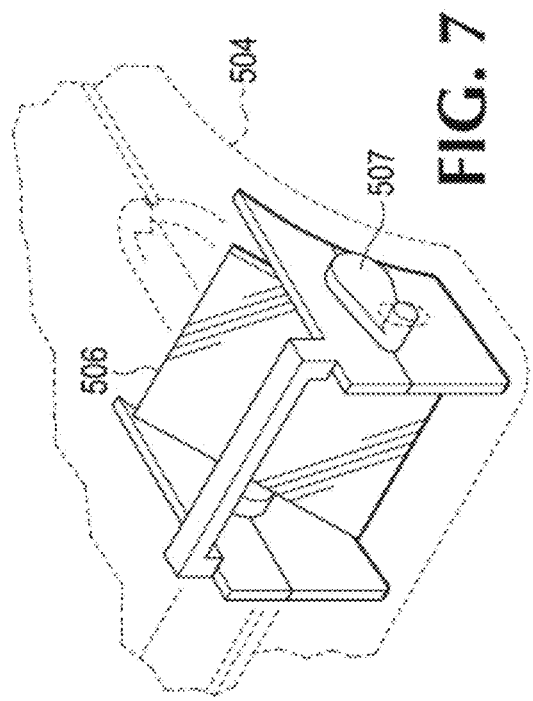

MOVEABLE MIRROR ASSEMBLY FOR ELECTRONIC DEVICE CASE

CROSS-REFERENCE TO RELATED APPLICATIONS

The present application claims the benefit under 35 U.S.C. § 120 as a continuation of U.S. patent application Ser. No. 14/218,732, which is titled "MOVEABLE MIRROR ASSEMBLY FOR ELECTRONIC DEVICE CASE" and was filed on Mar. 18, 2014 ("the '732 application"), the content of which is hereby incorporated by reference herein in its entirety.

The '732 application is a continuation-in-part of U.S. patent application Ser. No. 13/984,204, which is titled "CASE FOR PORTABLE ELECTRONIC DEVICE" and was filed on Aug. 27, 2013, which claims the benefit of U.S. Provisional Patent Application Ser. No. 61/499,073, which is titled "ELECTRONIC DEVICE CASE WITH MIRROR" and was filed on Jun. 20, 2011, the content of which is hereby incorporated by reference herein in its entirety, and International Application No. PCT/US2012/043184, titled "CASE FOR PORTABLE ELECTRONIC DEVICE," filed Jun. 19, 2012, the content of which is hereby incorporated by reference herein in its entirety.

The '732 application also claims the benefit of U.S. Provisional Patent Application Ser. No. 61/794,629, which is titled "MOVEABLE MIRROR ASSEMBLY FOR ELECTRONIC DEVICE CASE" and was filed on Mar. 15, 2013, the content of which is hereby incorporated by reference herein in its entirety.

TECHNICAL FIELD

The disclosed technology pertains to cases for portable electronic devices, and more particularly to moveable mirror assemblies suitable for use with cases for portable electronic devices.

BACKGROUND

To capture images and/or video using a portable electronic device, such as an Apple iPhone® or iPad® or any tablet computer or personal digital assistant (PDA) using an integrated rear-facing camera, a user would typically need to hold the device vertically in front of him or her due to the camera lens being located at the backside of the device and the viewing screen on the opposite side of the device. Such action generally draws attention from onlookers and may alert certain people to the fact that they are having their picture or video taken by the user. This could also be uncomfortable for the person taking the picture and/or video or waiting for a long period to get "the perfect shot" while holding the device in a vertical manner.

Consider an example in which a user attends a lecture and would like to capture a video and/or audio recording of the lecture using an electronic device so that he or she can later review the recording. Holding the device in front of him or her to do so would be not only awkward and uncomfortable but would also hinder his or her ability to take notes during the lecture.

Thus, there remains a need for an improved case for portable electronic devices, particularly with regard to capturing images and/or video using such a device.

BRIEF DESCRIPTION OF THE DRAWINGS

FIG. 6 illustrates an example of the portable electronic device and case therefor illustrated in FIG. 5 being used to capture images and/or video in accordance with embodiments of the disclosed technology.

FIG. 7 further illustrates the portable electronic device case illustrated in FIGS. 5 and 6.

DETAILED DESCRIPTION

Figure 1:
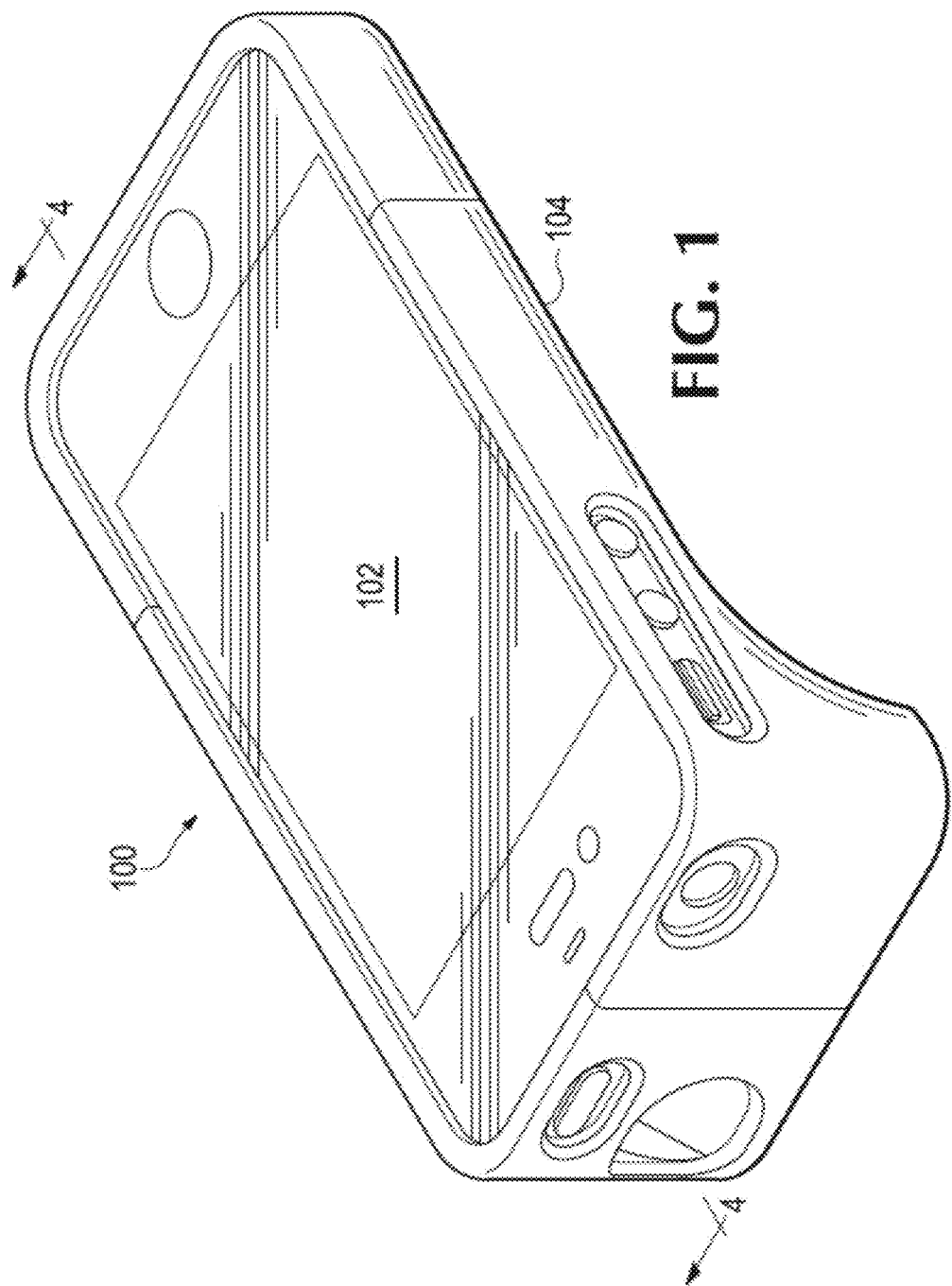
FIG. 1 illustrates a first arrangement of a first example of a portable electronic device and a case therefor in accordance with embodiments of the disclosed technology.

Embodiments of the disclosed technology generally include the use of a light-redirecting component or assembly such as a mirror, prism, or other suitable component or assembly to redirect light corresponding to an image or video being captured or recorded by the camera of an electronic device. As used herein, a light-redirecting component generally refers to a particular component, assembly, or sub-assembly configured to receive light, e.g., from an object being photographed and/or videoed, and re-direct the light such that, upon leaving the light-redirecting component, the redirected light is now traveling in a path other than it would have but for the influence of the light-redirecting component.

Implementations of the disclosed technology generally allow a user of a portable electronic device within a case therefor to hold or place the electronic device and case in a more vertical, normal usage manner than can be done with current devices. Such action is typically less conspicuous and/or easier for the user than with current portable electronic device cases. Also, the manner in which a user may hold the electronic device in these embodiments or place the device on a flat surface generally allows for easier manipulation of the controls on the front of the device by the user.

An electronic device case in accordance with embodiments of the disclosed technology may be configured to hold an electronic device, such as the Apple iPhone or iPad, iPad 2, or iPod Touch, or any tablet computer or PDA that has a built-in camera/video recorder at or on the rear of the electronic device, for example. The case may hold the device at an angle from a given plane, such as an artificial plane or physical plane, e.g., the surface of a table or desk, for ease of manipulating the face plate. The angle from the surface may be anywhere from 10 degrees to 35 degrees, for example. In certain embodiments, the camera and/or video recorder component(s) of the device may have a Field Of View (FOV) of approximately 40 degrees vertical and 52 degrees horizontal when held straight up and down. In such embodiments, the device may be rotated substantially 90 degrees left or right and change the image/video capture to a "landscape" format. Other embodiments may provide other FOVs. In some embodiments, a user may be able to perform certain operations with regard to use of the device, e.g., zoom features, which may serve to change or functionally alter a FOV.

Alternatively or in addition to other embodiments described herein, the electronic device case may be used by a user as a shoulder cradle, e.g., to use the device in a hands-free manner.

In certain embodiments, a light-redirecting component, e.g., mirror or prism, may be implemented in connection with a case for an electronic device to enable a user to take pictures and/or record videos while holding the electronic device in a more natural position. The light-redirecting component may be a built-in component or assembly and may be manipulated, e.g., moved, repositioned, and/or partially or fully removed, by the user. In alternative embodiments, the light-redirecting component may be removable. For example, such embodiments may include multiple types of mirrors, each of which may be placed or situated within or in connection with the case.

FIG. 1 illustrates a first arrangement 100 of a first example of a portable electronic device 102 and a case 104 therefor in accordance with embodiments of the disclosed technology. The portable electronic device 102 may be a personal digital assistant (PDA), smartphone (e.g., an Apple iPhone or Android-based device), or virtually any other type of portable electronic device. In the first arrangement 100, the device 102 is positioned within the case 104. The device 102 may be secured in that it does not readily fall out of the case 104. In the illustrated arrangement 100, the case 104 may provide the device 102 with protection as well as the other features described below.

Figure 2:
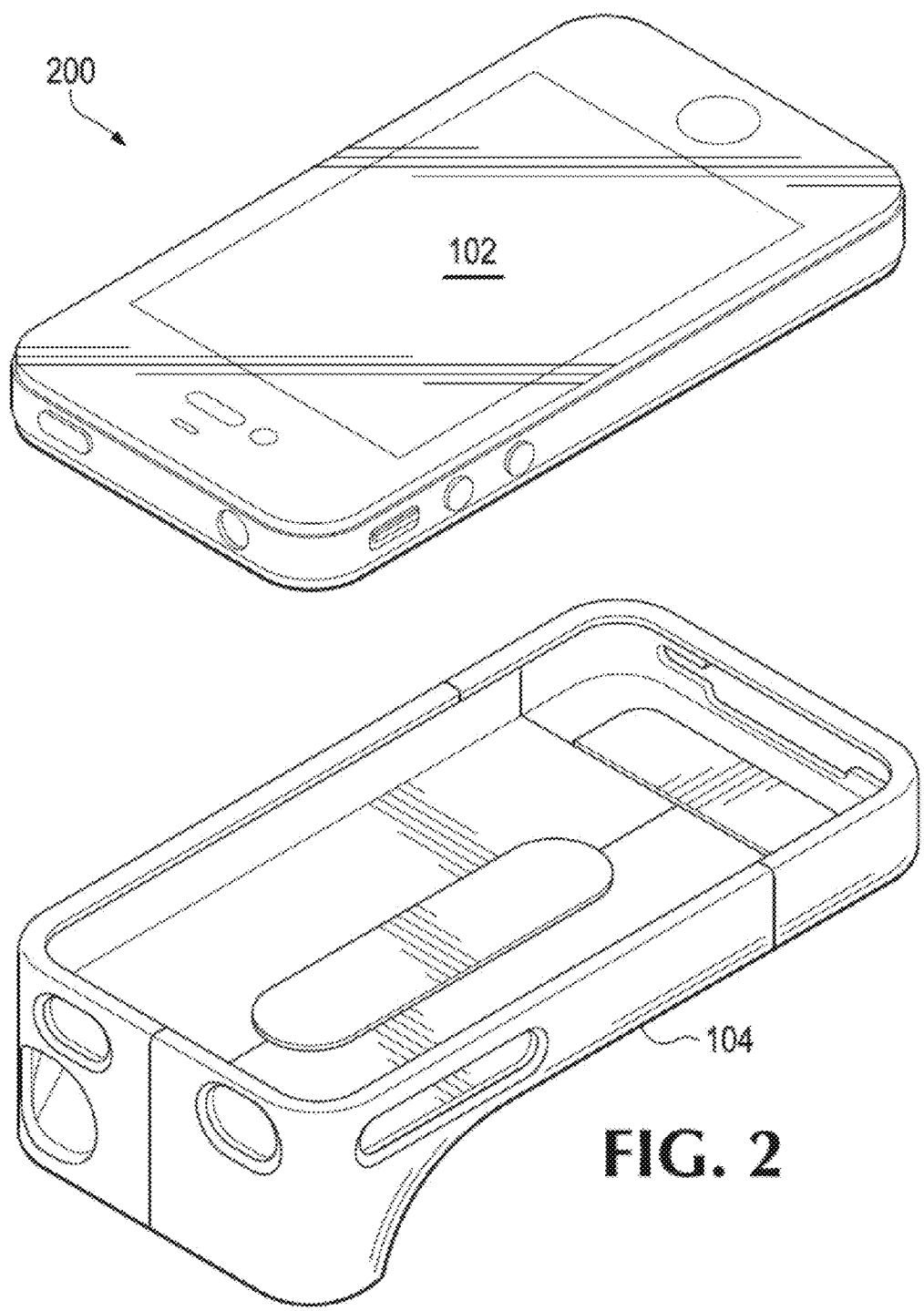
FIG. 2 illustrates a second arrangement of the first example of a portable electronic device and case therefor illustrated in FIG. 1.

FIG. 2 illustrates a second arrangement 200 of the first example of the portable electronic device 102 and case 104 therefor illustrated in FIG. 1. In the second arrangement 200, the device 102 is fully removed from the case 104. Embodiments of the disclosed technology generally provide a user with the ability to both easily remove the device 102 from the case 104 and also position the device 102 within the case 104, as illustrated in FIG. 1, for example.

Figure 3:
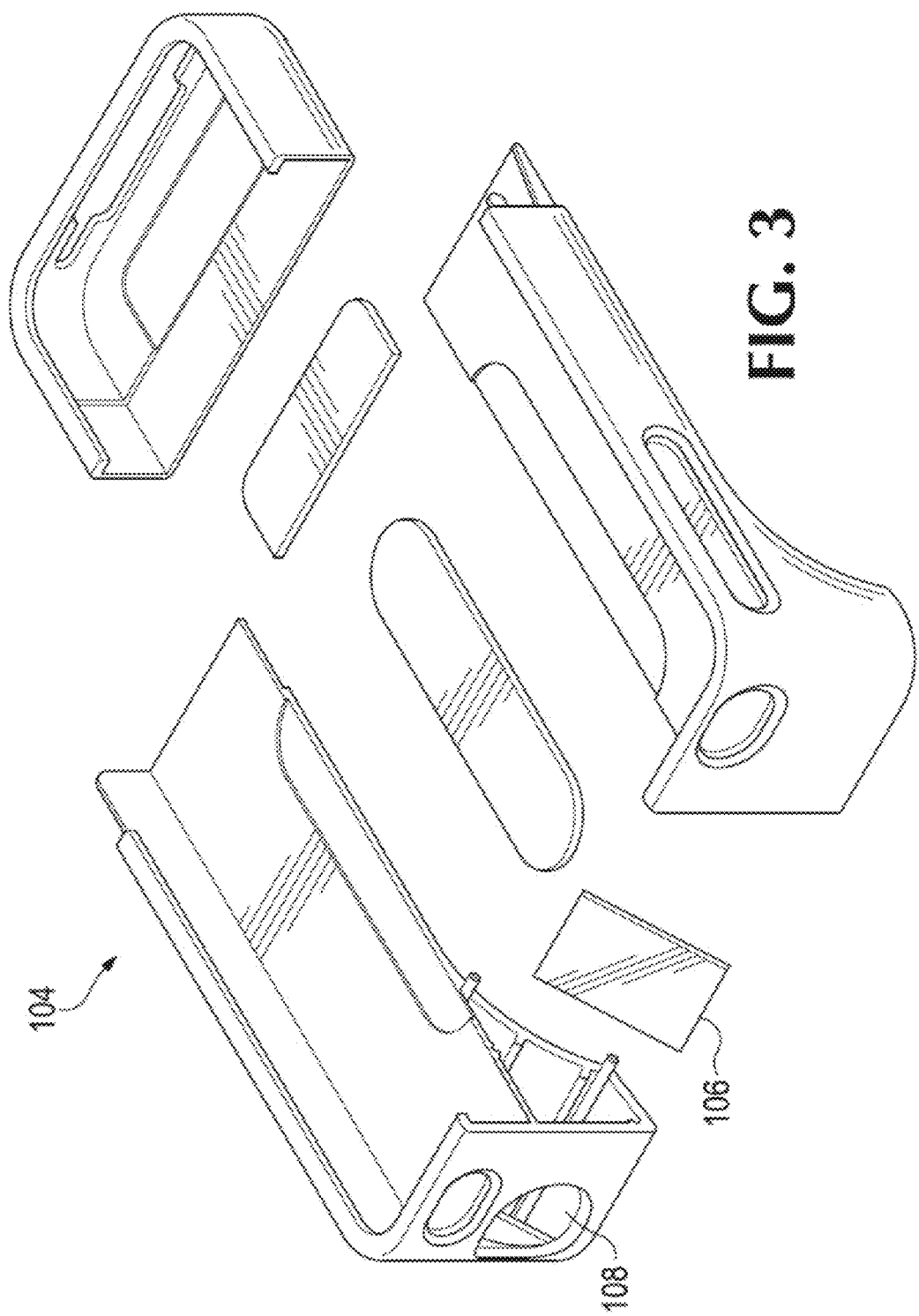
FIG. 3 illustrates an exploded view of the portable electronic device case illustrated in FIGS. 1 and 2.

FIG. 3 illustrates an exploded view of the portable electronic device case 104 illustrated in FIGS. 1 and 2. While this view shows a particular arrangement of the case 104, it will be appreciated that the case 104 may be constructed in a variety of manners using any of a number of design and manufacturing techniques and materials, such as high-density polyethylene (HDPE), acrylonitrile butadiene styrene (ABS), high-density rubber or metal, or any combination thereof.

In the illustrated example, a light-redirecting component 106, such as a mirror, is integrated with, e.g., within, the case 104. An opening 108 within the case 104 allows for light to easily pass therethrough and onto the light-redirecting component 106 when the case 104 is assembled and the device 102 is positioned therein, as in FIGS. 1 and 2, for example.

Figure 4:
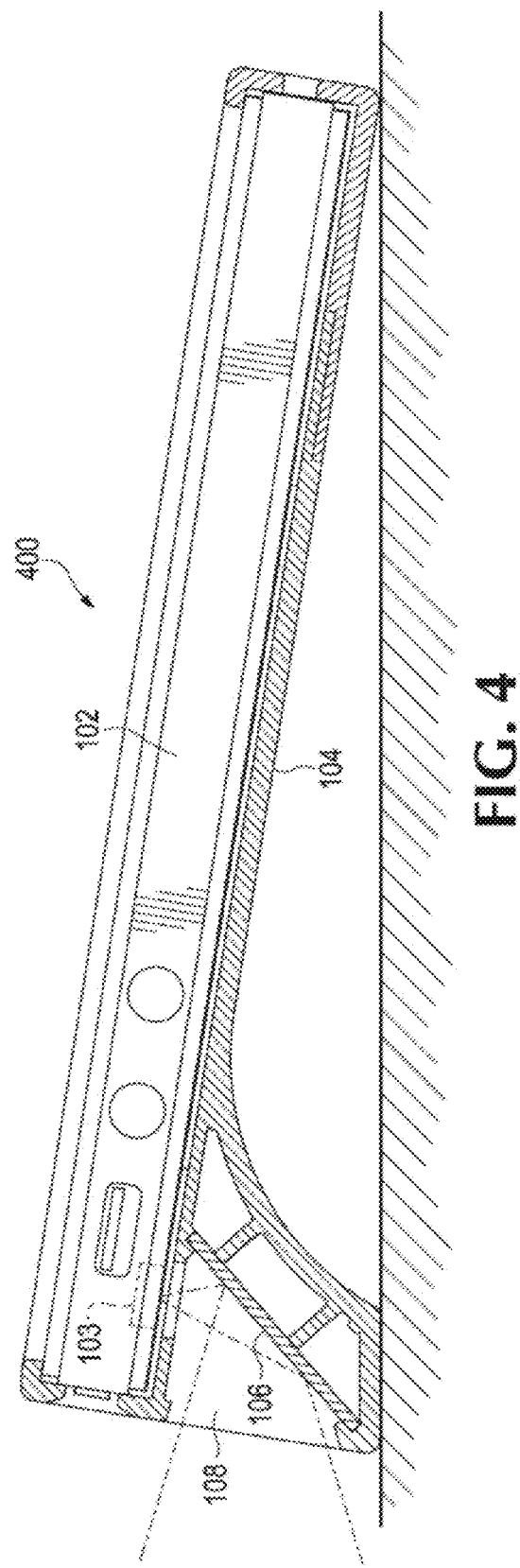
FIG. 4 illustrates an example of the portable electronic device and case therefor illustrated in FIGS. 1-3 being used to capture images and/or video in accordance with embodiments of the disclosed technology.

FIG. 4 illustrates an example 400 of the portable electronic device 102 and case 104 therefor illustrated in FIGS. 1-3 being used to capture images and/or video in accordance with embodiments of the disclosed technology. In the example 400, the case 104 has a light-redirecting component 106 and an opening 108 as illustrated in FIG. 3. The opening 108 in the case 104 allows for incoming light to pass therethrough and onto the light-redirecting component 106 such that the light may be redirected, e.g., reflected, and subsequently received by a camera component 103, e.g., camera lens, of a portable electronic device 102 positioned with the case 104. In this manner, the camera component 103 may capture light corresponding to a field of view that a user desires to record in the form of images, video, or both. The size and/or shape of the opening 108 may correspond to the size and/or shape of the camera component 103. For example, the opening 108 may be substantially the same shape as and/or slightly larger than the camera component 103. In some embodiments, a user may be able to perform certain operations with the device, e.g., zoom features, which may serve to reduce or fully eliminate certain issues that may otherwise result from the opening 108 having a size and/or shape that is substantially similar to or less than the camera component 103.

Figure 5:
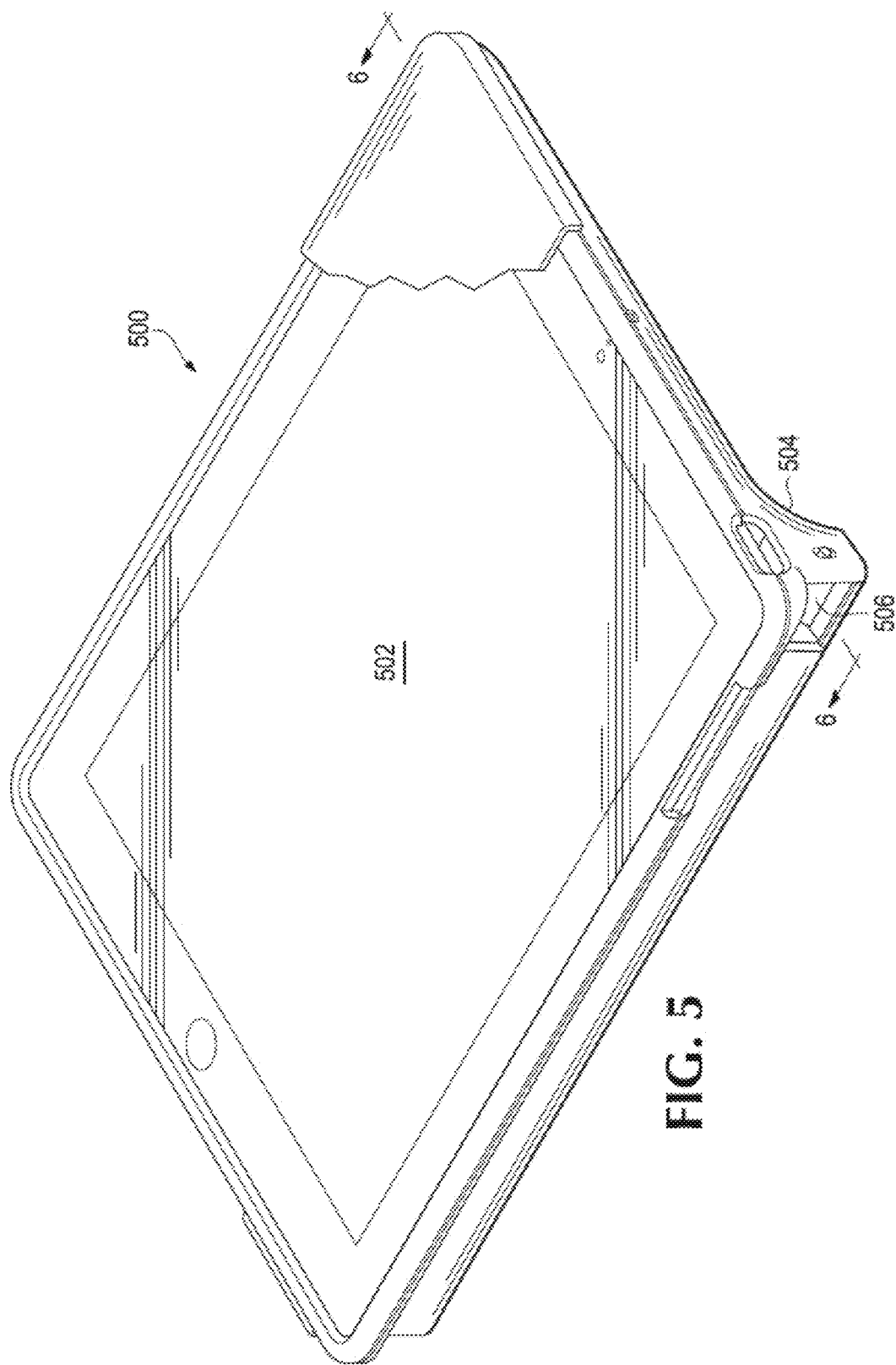
FIG. 5 illustrates a second example of a portable electronic device and a case therefor in accordance with embodiments of the disclosed technology.

FIG. 5 illustrates a second example 500 of a portable electronic device 502 and a case 504 therefor in accordance with embodiments of the disclosed technology. In the example 500, the case 504 is similar to but larger than the case 104 of FIGS. 1-4 so as to accommodate a larger device 502, such as an Apple iPad, for example. In the illustrated example 500, the case 504 has a light-redirecting component 506 whose functionality is substantially similar to that of the light-redirecting component 106 of FIGS. 3 and 4. The light-redirecting component 506 may be permanently integrated with, e.g., positioned within, the case 504. In alternative embodiments, the light-redirecting component 506 may be removable, e.g., replaceable or swappable with other types of light-redirecting components or assemblies.

FIG. 6 illustrates an example of the portable electronic device 502 and case 504 therefor illustrated in FIG. 5 being used to capture images and/or video in accordance with embodiments of the disclosed technology. In the example, light may pass through the opening 508 and onto the light-redirecting component 506, which redirects, e.g., reflects, the light to the camera component 503. The example also illustrates a connecting mechanism 507 that may serve to couple the light-redirecting component 506 to the case 504 such that the component 506 may be re-positioned with regard to the opening 508. An example of this is described below with regard to FIG. 7.

FIG. 7 further illustrates the portable electronic device case 504 illustrated in FIGS. 5 and 6. In particular, FIG. 7 shows the light-redirecting component 506 and connecting mechanism 507. In this example, the connecting mechanism 507 includes an axle and a handle such that a user may rotate, e.g., swivel, the light-redirecting component 506, e.g., to change the angle of light redirection, e.g., reflection, to the camera component 503 of the portable electronic device 502.

In certain embodiments, an electronic device case may include a light-redirecting component that is includes a flip-out component incorporated with a stand. Such arrangements may be advantageous for larger electronic devices such as an Apple iPad device, for example.

Figure 8:
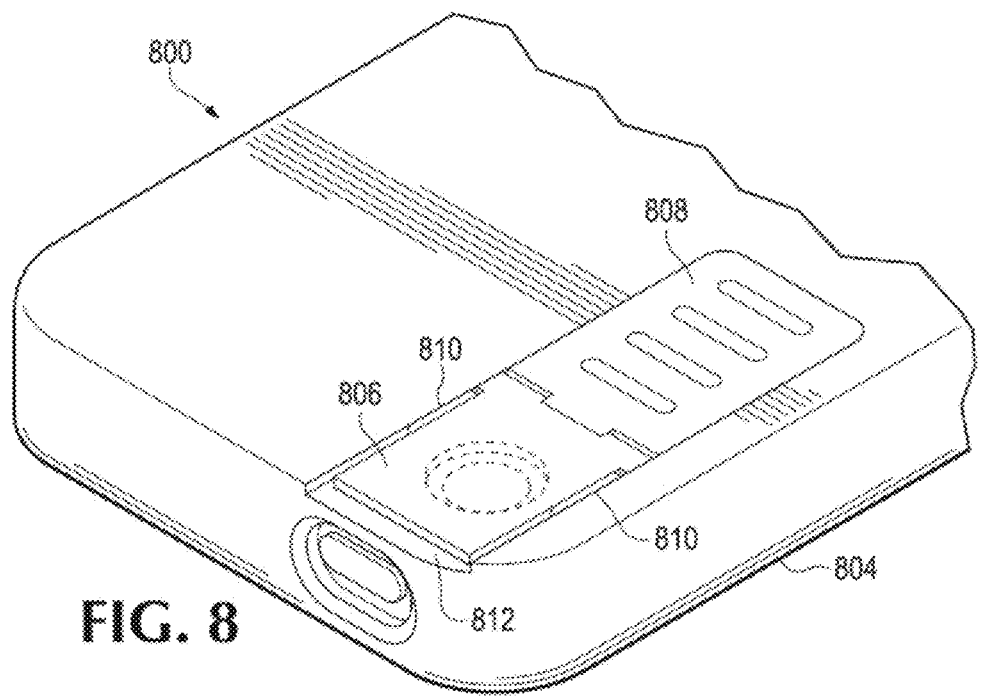
FIG. 8 illustrates a first position for a third example of a portable electronic device and a case therefor in accordance with embodiments of the disclosed technology.

FIG. 8 illustrates a first position 800 for a third example of a portable electronic device and a case 804 therefor in accordance with embodiments of the disclosed technology. In the example, the case 804 has integrated therewith a moveable sub-assembly that includes a sliding component 808 and a light-redirecting component 806, such as a mirror. Two connecting pieces 810 are provided such that, when a user moves the sliding component 808 in a certain direction, the light-redirecting component 806 may move in response thereto. For example, the light-redirecting component 806 may slide along the case 804 and rotate such that light received by the light-redirecting component 806 may be redirected, e.g., reflected, to a camera component. In the example, a "sub-floor" portion 812, discussed further below, is partially exposed.

Figure 9:
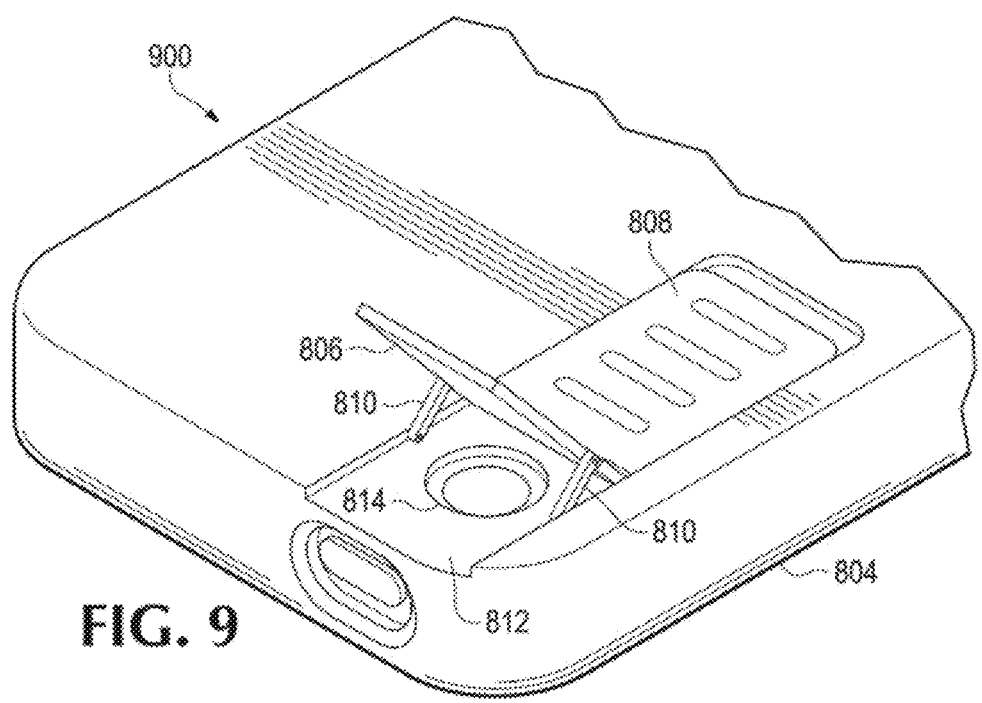
FIG. 9 illustrates a second position for the third example of a portable electronic device and case therefor illustrated in FIG. 8.

FIG. 9 illustrates a second position 900 for the third example of a portable electronic device and case therefor illustrated in FIG. 8. In this example, the light-redirecting component 806 has moved and rotated responsive to a user moving, e.g., sliding, the sliding component 808. An angle between the light-redirecting component 806 and a plane of the case 804 is larger than zero but less than ninety degrees. In certain embodiments, the light-redirecting component may lock once a particular angle has been established. Alternatively, a user may be able to easily establish, or re-establish, virtually any angle between zero and ninety degrees. In this example 900, the "sub-floor" portion 812 is more fully exposed and reveals an opening 814 through which light may easily travel.

Figure 10:
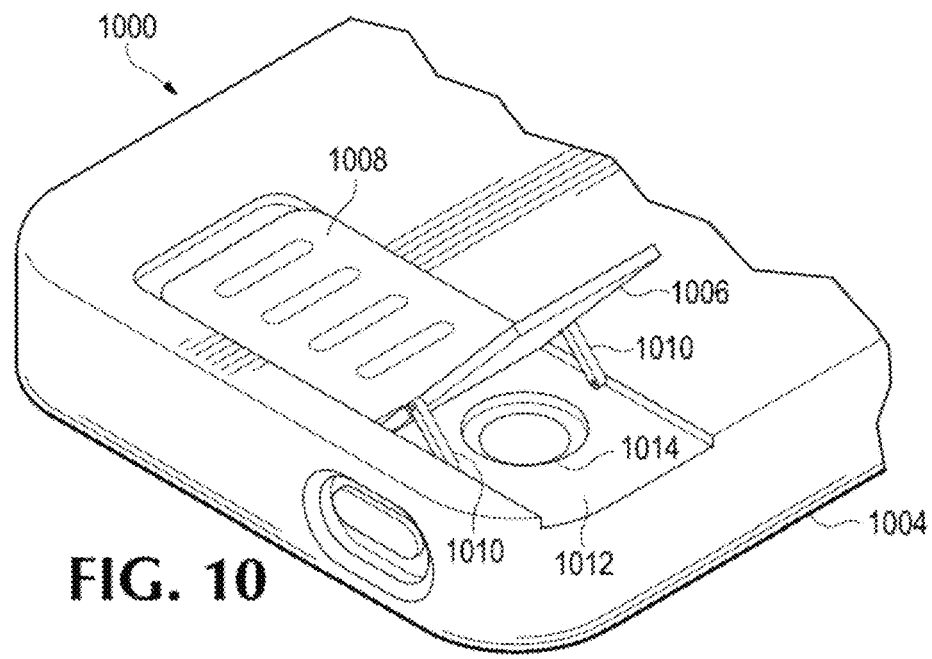
FIG. 10 illustrates a fourth example of a portable electronic device and a case therefor in accordance with embodiments of the disclosed technology.

FIG. 10 illustrates a fourth example 1000 of a portable electronic device and a case therefor in accordance with embodiments of the disclosed technology. This example 1000 is similar to the arrangement illustrated in FIG. 9 in that an electronic device case 1004 has integrated therewith a moveable sub-assembly that includes a sliding component 1008, a light-redirecting component 1006, and connecting pieces 1010, and a "sub-floor" portion 1012 having an opening 1014 through which light may easily travel. Whereas the moveable sub-assembly is in a substantially vertical ("portrait") orientation with regard to the device within the case 804 illustrated in FIG. 9, however, the moveable sub-assembly is in a substantially horizontal ("landscape") orientation with regard to the device within the case 1004 illustrated in FIG. 10.

Figure 11:
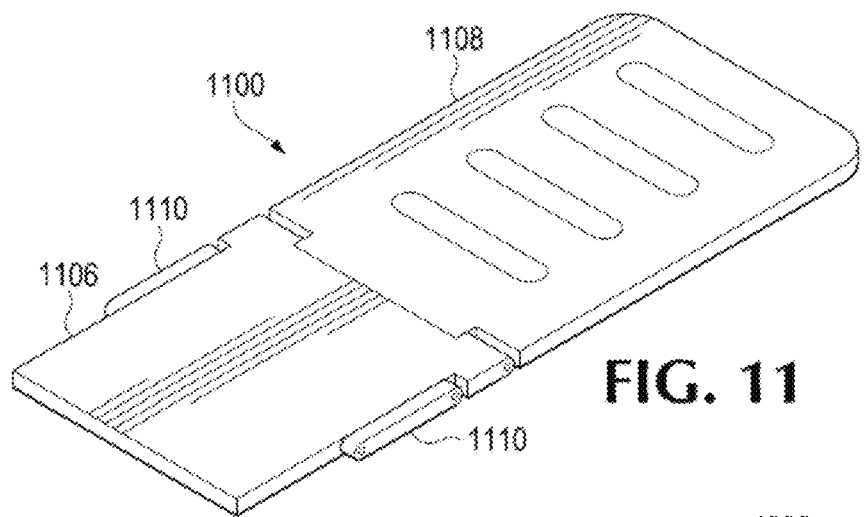
FIG. 11 illustrates an example of a more detailed example of a moveable sub-assembly, such as those illustrated in FIGS. 8-10, in accordance with certain embodiments of the disclosed technology.

FIG. 11 illustrates a more detailed example of a moveable sub-assembly 1100 in accordance with certain embodiments of the disclosed technology. The moveable sub-assembly 1100 is similar to the moveable sub-assemblies described above in that it has a sliding component 1108, a light-redirecting component 1106, and connecting pieces 1110. The connecting pieces may serve to connect the light-redirecting component 1106 to a case, such as the cases 804 and 1104 of FIGS. 8-9 and 10, respectively.

In certain embodiments, the moveable sub-assembly 1100 may be integrated into a portable electronic device case such that it can be easily moved and/or positioned away from an opening within the case when in a closed position, e.g., when flat against the case or otherwise substantially planar with the backside of the case. This functionality may be in place of or in addition to that provided by such a moveable sub-assembly as described above with particular regard to FIGS. 8-10. The sub-assembly 1100 may also have associated therewith a capability of being secured, e.g., locked, in such a "closed" position. In certain embodiments, a user may be able to rotate or otherwise move or re-position the moveable sub-assembly 1100 with respect to the case such that the sub-assembly 110 provides a "portrait" orientation (see, e.g., FIG. 9) when in a first position and a "landscape" orientation (see, e.g., FIG. 10) when in a second position.

An electronic device case in accordance with the disclosed technology may provide a user with ease of use in terms of covert recording. For example, a case with an integrated mirror could be used for covert, inconspicuous, or unobtrusive image capture or live video recording using an electronic device.

In certain embodiments, a software application component of the disclosed technology may include features such as "going to a blank screen" or other information on the screen during image capture or recording. Alternatively or in addition thereto, a small thumbnail of the actual image or video and/or a counter may be provided to confirm for the user that the image is being captured or video recorded.

Figure 12:
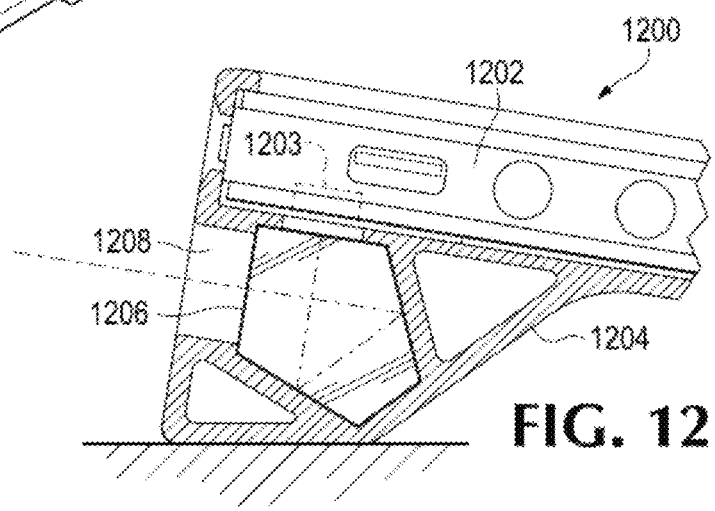
FIG. 12 illustrates a fifth example of a portable electronic device and a case therefor in accordance with embodiments of the disclosed technology.

FIG. 12 illustrates a fifth example 1200 of a portable electronic device 1202 and a case 1204 therefor in accordance with embodiments of the disclosed technology. In this example 1200, the case 1204 has integrated therewith, e.g., within, a pentaprism 1206 configured to receive light through an opening 1208 in the case 1204 and redirect the light to a camera component 1203, e.g., lens.

Certain embodiments may include a software application to perform certain functions, e.g., rotating and mirroring, on the captured image or video to allow the captured image or video to be recorded at a particular position, e.g., a normal viewable position. This is because, when capturing images or recording video through the mirror or a prism, the images/video will typically be upside down and reversed.

Figure 13:
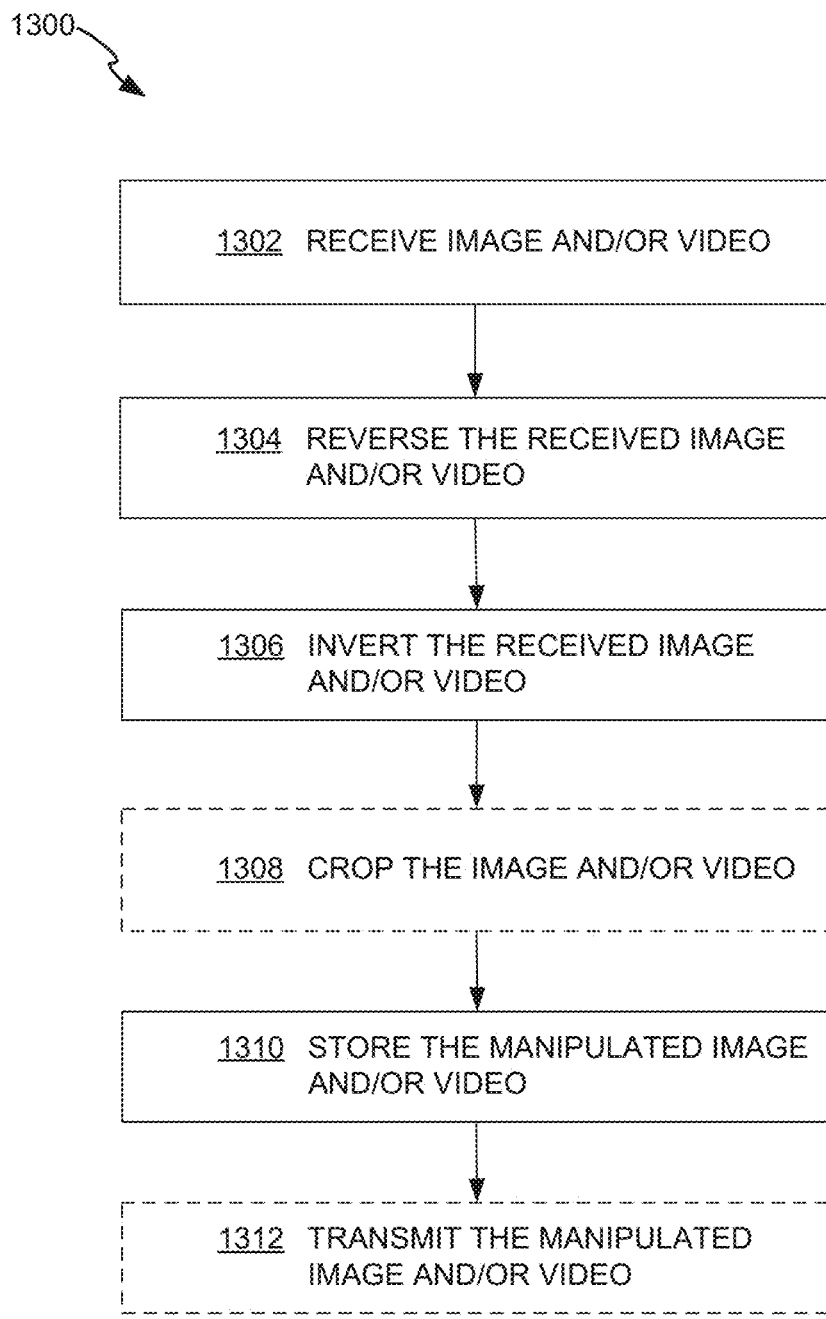
FIG. 13 is a flowchart illustrated an example of a method of capturing image and/or video using a portable electronic device and case therefor in accordance with embodiments of the disclosed technology.

FIG. 13 is a flowchart illustrated an example of a method 1300 of capturing image and/or video using a portable electronic device and case therefor in accordance with embodiments of the disclosed technology. At 1302, the device receives image and/or video in the form of light that is redirected, e.g., reflected, by a corresponding component, e.g., mirror or prism, that may be integrated with the case or part of a moveable mirror assembly in accordance with embodiments described below.

At 1304, the device causes the received image and/or video to be reversed. This may be accomplished using any of a number of suitable data manipulation techniques. At 1306, the device causes the received image and/or video to be inverted. As with the reversing operation at 1304, the inverting operation at 1306 may be accomplished using any of a number of suitable data manipulation techniques.

At 1308, the image and/or video may be optionally cropped, e.g., to effectively remove any vignetting resulting from the size and/or shape of the opening in the case, through which light may pass, with respect to the size and/or shape of the camera component that receives the light passing through the opening. The operations at 1304, 1306, and 1308 may be performed fully separately from each other, or they may be performed at least partially concurrently with each other.

At 1310, the device may store the manipulated image and/or video data, e.g., locally and/or at a remote device, network, etc. At 1312, the device may optionally transmit the manipulated data to a particular destination.

Figure 14:
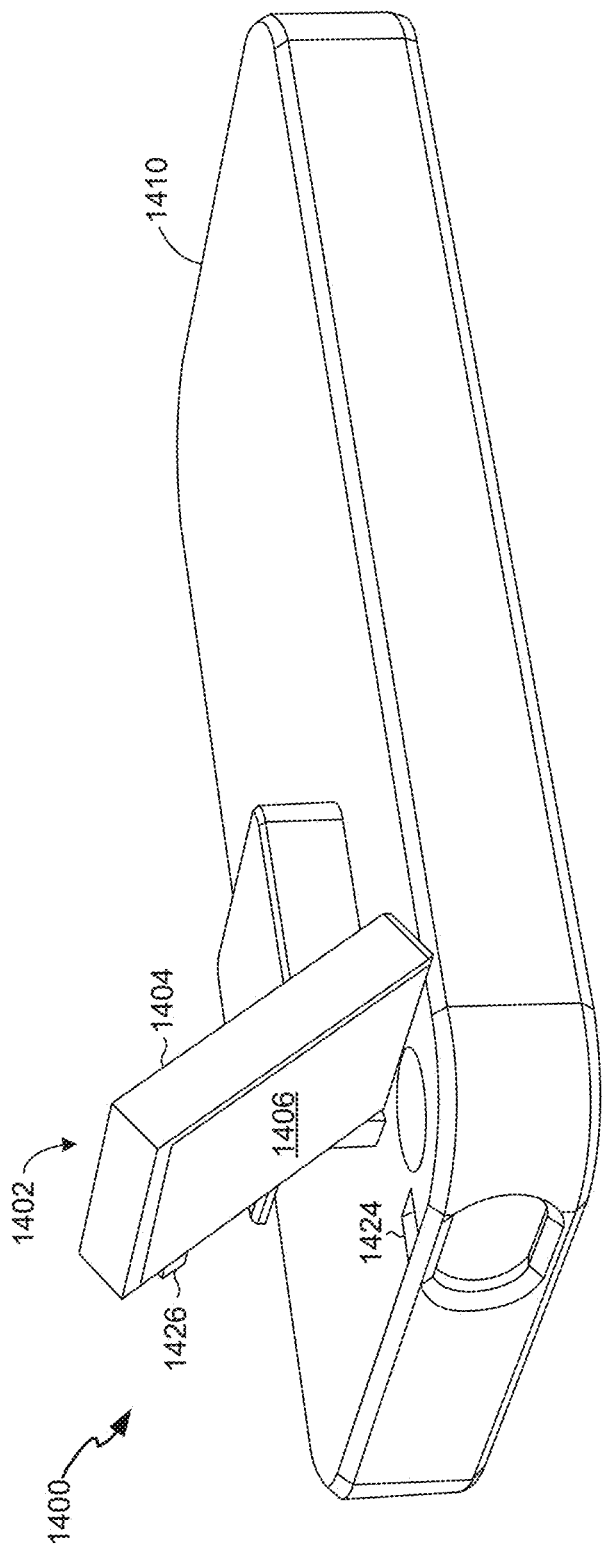
FIG. 14 illustrates a first example of a mirror assembly integrated or otherwise coupled with a portable electronic device case in accordance with certain embodiments of the disclosed technology.

FIG. 14 illustrates a first example 1400 of a moveable mirror assembly 1402 integrated with or otherwise coupled with a portable electronic device case 1410 in accordance with certain embodiments of the disclosed technology. The moveable mirror assembly 1402 may include a mirror housing 1404 and a mirror 1406 suitable for redirecting light, e.g., to and/or from an electronic device within the electronic device case 1410.

In the example 1400, the moveable mirror assembly 1402 may accommodate image/video projection and/or capture in a first (e.g., portrait) orientation. In a first, "closed" position, the mirror 1406 may be substantially parallel to—and in overall general close proximity to—a surface of the electronic device case 1410. In a second, "open" position, however, the mirror housing 1404 may be rotated about an axis along the surface of the electronic device case 1410 such that an angle defined by the mirror 1406 and the electronic device case 1410 is greater than zero degrees but no more than 90 degrees.

In the example, the moveable mirror assembly 1402 includes a first tab 1426 integrated with the mirror housing 1404, and a first opening 1424 in the case 1410 that corresponds to the first tab 1426. The tab 1426 and corresponding opening 1424 are optional features. In certain embodiments, the tab 1426 and corresponding opening 1424 may be mated with each other in connection with switching the moveable mirror assembly 1402 from a first (e.g., portrait) orientation to a second (e.g., landscape) orientation. Another tab integrated with the mirror housing 1404—and corresponding opening in the case 1410—may be mated with each other in connection with the moveable mirror assembly being in the first (e.g., portrait) orientation. Because the moveable mirror assembly 1402 is in the portrait orientation in FIG. 14, such tab and opening are not visible.

Figure 15:
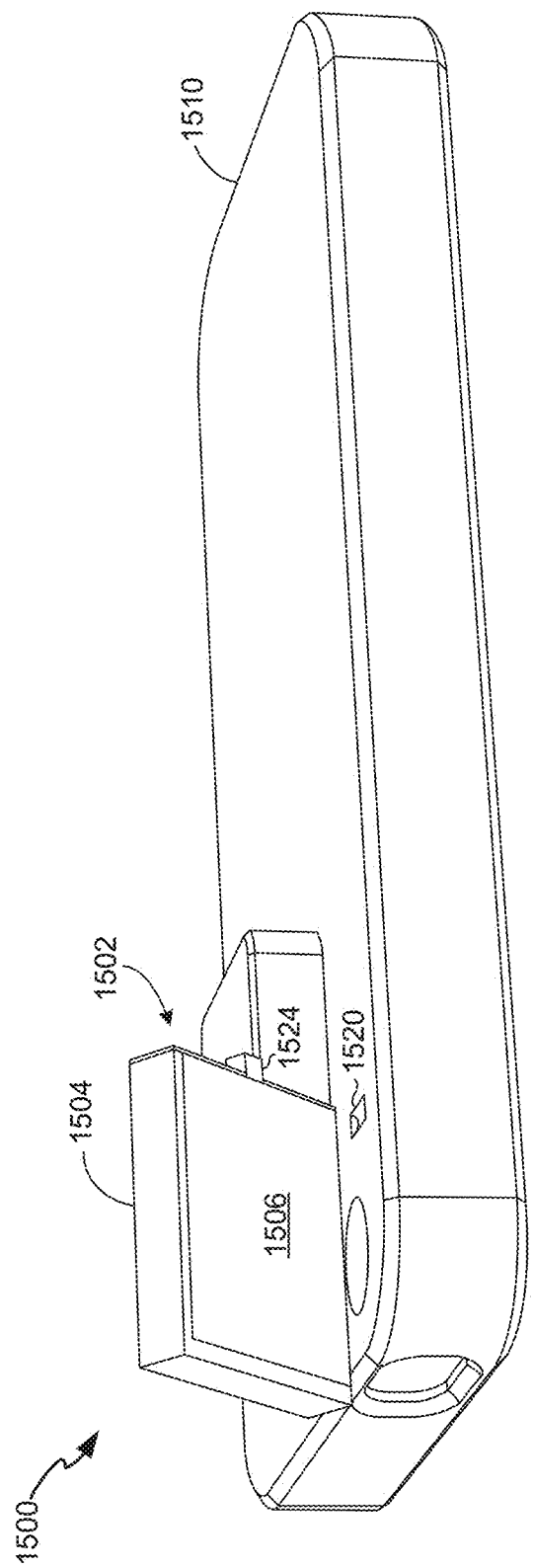
FIG. 15 illustrates a second example of a mirror assembly integrated or otherwise coupled with a portable electronic device case in accordance with certain embodiments of the disclosed technology.

FIG. 15 illustrates a second example 1500 of a moveable mirror assembly 1502 integrated with or otherwise coupled with a portable electronic device case 1510 in accordance with certain embodiments of the disclosed technology. The moveable mirror assembly 1502 may include a mirror housing 1504 and a mirror 1506 suitable for redirecting light, e.g., to and/or from an electronic device within the electronic device case 1510.

In the example 1500, the moveable mirror assembly 1502 may accommodate image/video projection and/or capture in a second (e.g., landscape) orientation. In a first, "closed" position, the mirror 1506 may be substantially parallel to—and in overall general close proximity to—a surface of the electronic device case 1510. In a second, "open" position, however, the mirror housing 1504 may be rotated about an axis along the surface of the electronic device case 1510 such that an angle defined by the mirror 1506 and the electronic device case 1510 is greater than zero degrees but no more than 90 degrees.

In the example, the moveable mirror assembly 1502 includes a first tab 1524 integrated with the mirror housing 1504, and a first opening 1520 in the case 1510 that corresponds to the first tab 1524. The tab 1524 and corresponding opening 1520 are optional features. In certain embodiments, the tab 1524 and corresponding opening 1520 may be mated with each other in connection with switching the moveable mirror assembly 1502 from a first position (e.g., a landscape orientation) to a second position (e.g., a portrait orientation). Another tab integrated with the mirror housing 1504—and corresponding opening in the case 1510—may be mated with each other in connection with the moveable mirror assembly being in the first (e.g., landscape) orientation. Because the moveable mirror assembly 1502 is in the landscape orientation in FIG. 15, such tab and opening are not visible.

Figure 16A:
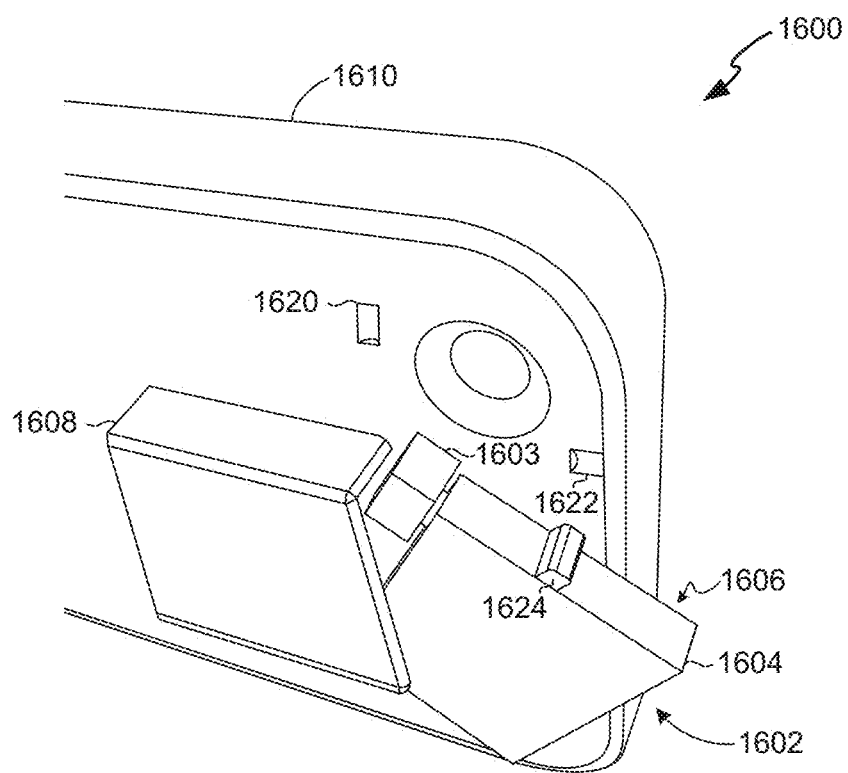
FIGS. 16A and 16B illustrate a third example of a mirror assembly integrated or otherwise coupled with a portable electronic device case in accordance with certain embodiments of the disclosed technology.
Figure 16B:
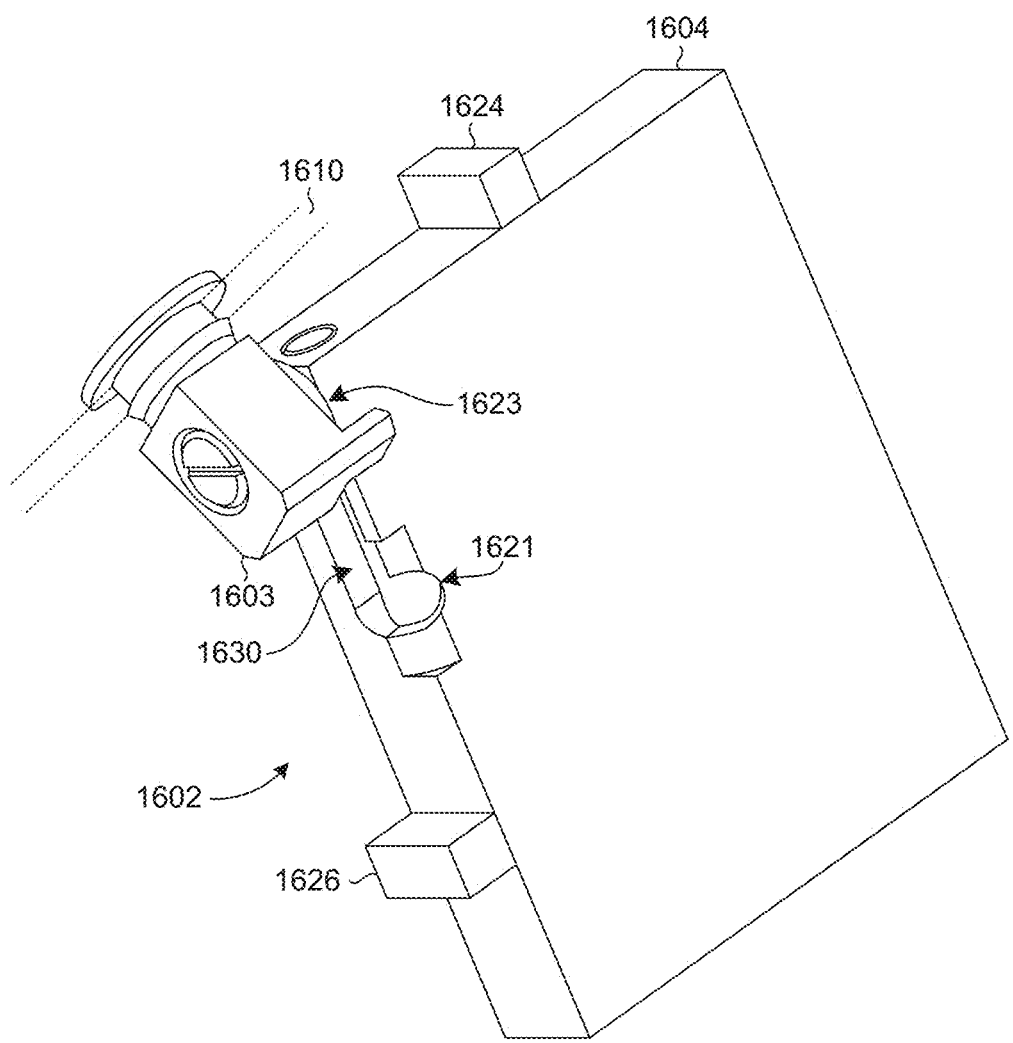

FIGS. 16A-16B illustrate a third example 1600 of a moveable mirror assembly 1602 integrated or otherwise coupled with a portable electronic device case 1604 in accordance with certain embodiments of the disclosed technology. The moveable mirror assembly 1602 may include a mirror housing 1604 and a mirror 1606 suitable for redirecting light, e.g., to and/or from an electronic device within the electronic device case 1610.

FIG. 16A illustrates how, in the example 1600, the moveable mirror assembly 1602 may be rotated, e.g., moved rotationally, by way of a rotational member 1603 that is integrated with or otherwise coupled with the electronic device case 1601. In a first, "closed" position, the moveable mirror assembly 1602 may be substantially within a mirror assembly protective housing 1608 that is integrated with or otherwise coupled with the electronic device case 1610.

The moveable mirror assembly 1602 may be rotated by way of the rotational member 1603 such that it "exits" the protective housing 1608 until the moveable mirror assembly 1602 reaches a certain position, e.g., suitable for redirecting light to and/or from an electronic device within the electronic device case 1610. In the example 1600, the moveable mirror assembly 1602 is in transition between the first, "closed" position and a position suitable for redirecting light to and/or from an electronic device within the electronic device case 1610.

FIG. 16B provides a closer look at the moveable mirror assembly 1602. The rotational member 1603 is coupled with a channel 1630 in the mirror housing 1604. A user may slide the mirror housing 1604 from a first position (e.g., a portrait orientation) to a second position (e.g., a landscape orientation) by way of interaction between the rotational member 1603 and the channel 1630.

In the example, the moveable mirror assembly 1602 includes a first tab 1624 integrated with the mirror housing 1604, and a first opening 1620 in the case 1610 that corresponds to the first tab 1624. The tab 1624 and corresponding opening 1620 are optional features. In certain embodiments, the tab 1624 and corresponding opening 1620 may be mated with each other in connection with switching the moveable mirror assembly 1602 from to a portrait orientation, e.g., from the "closed" position or from a landscape orientation.

The moveable mirror assembly 1602 also includes a second tab 1626 integrated with the mirror housing 1604, and a second opening 1622 in the case 1610 that corresponds to the second tab 1626. These features are also optional. In certain embodiments, the tab 1626 and corresponding opening 1622 may be mated with each other in connection with switching the moveable mirror assembly 1602 from to a landscape orientation, e.g., from the "closed" position or from a portrait orientation.

Consider an example in which the moveable mirror assembly 1602 is in a first, "closed" position. In such position, the moveable mirror assembly 1602 is positioned substantially within a space defined by the protective housing 1608. In the example, a user may shift the moveable mirror assembly 1602 to a second position (e.g., a "portrait orientation") by rotating the mirror housing 1604 (and, thus, the mirror 1606) about a point on the electronic device case 1610 by way of the rotational member 1603. The user may "lock" the moveable mirror assembly 1602 in place by rotating the moveable mirror assembly "up" from the electronic device case 1610 such that the first tab 1624 is received by the corresponding opening 1620. The user may now take photos or videos in a first (e.g., portrait) orientation by way of light being redirected from the mirror 1606, e.g., to the lens of an electronic device within the electronic device case 1610 through a hole in the electronic device case 1610.

In the example, the user may then rotate the moveable mirror assembly 1602 back "down" to the electronic device case 1610. The user may then shift the moveable mirror assembly 1602 to a third position (e.g., a "landscape orientation") by sliding the moveable mirror assembly 1602 along the electronic device case 1610. For example, the user may slide the mirror housing 1604 such that the rotational member 1603 moves from a first location 1623 within the channel 1630 in the mirror housing 1604 to a second location 1621 within the channel 1630 in the mirror housing 1604. The user may "lock" the moveable mirror assembly 1602 in place by rotating the moveable mirror assembly "up" from the electronic device case 1610 such that the second tab 1626 is received by the corresponding opening 1622. The user may now take photos or videos in a second (e.g., landscape) orientation by way of light being redirected from the mirror 1606, e.g., to the lens of an electronic device within the electronic device case 1610 through a hole in the electronic device case 1610.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A case for a portable electronic device having a display screen on a front of the portable electronic device, the case comprising:
   a housing having a shape fitted at least in part to a shape of at least a portion of an exterior of the portable electronic device and arranged to receive and hold the at least the portion of the portable electronic device, the housing comprising:
      a first opening on a front surface of the housing to correspond to a position of the display screen on the front of the portable electronic device when the portable electronic device is disposed in the housing;
      a protrusion extending from a back surface of the housing and integrated with the housing, the protrusion having a protrusion top surface, the protrusion being arranged to extend away from a back of the portable electronic device when the portable electronic device is disposed in the housing;
      at least one second opening in the protrusion top surface of the protrusion from the housing; and
      at least one optical element, disposed within the protrusion from the housing, to convey light between the at least one second opening in the protrusion top surface of the housing and the back of the portable electronic device when the portable electronic device is disposed in the housing, the at least one optical element comprising at least one light-redirecting component arranged in the protrusion so as to redirect light entering the at least one second opening in the protrusion top surface of the protrusion, when the portable electronic device is disposed in the housing, to a camera disposed on the back of the portable electronic device,
   wherein:
      the protrusion comprises one or more mounting elements, disposed inside the protrusion, to provide a mount that is angled with respect to the back of the portable electronic device and angled with respect to the protrusion top surface; and
      the at least one light-redirecting component is mounted on the one or more mounting elements so as to be mounted angled with respect to the back of the portable electronic device and angled with respect to the protrusion top surface.

2. The case of claim 1, wherein one or more of the at least one light-redirecting component comprise one or more mirrors.

3. The case of claim 1, wherein the at least one second opening is an empty opening.

4. The case of claim 1, wherein:
   the back surface of the housing comprises a planar region that is closer to a bottom of the housing than is the protrusion and that extends across a width of the back surface of the housing.

5. The case of claim 4, wherein an interior side of the housing at the planar region is arranged to be flush with at least a portion of the back of the portable electronic device when the portable electronic device is disposed in the housing.

6. The case of claim 5, wherein the planar region is arranged to be parallel to the back of the portable electronic device when the portable electronic device is disposed in the housing.

7. The case of claim 4, wherein:
   the planar region is a first planar region;
   the protrusion extends across the width of the back surface of the housing;
   the protrusion comprises a second planar region disposed on a back surface of the protrusion, the second planar region being in a different plane than the first planar region; and
   the housing further comprises a sloped surface between the first planar region and the second planar region.

8. The case of claim 1, wherein the at least one second opening is disposed at a lateral position in the protrusion top surface of the protrusion to correspond to a lateral position of the camera in the back of the portable electronic device when the portable electronic device is disposed in the housing.

9. The case of claim 8, wherein:
   one or more of the at least one light-redirecting component are arranged at the lateral position; and the at least one second opening comprises an opening that has substantially a same size as a surface of the camera on the back of the portable electronic device.

10. The case of claim 8, wherein
the housing is shaped in part to fit to a top of the portable electronic device, a bottom of the portable electronic device, a right side of the portable electronic device, and a left side of the portable electronic device so as to receive and hold an entirety of the portable electronic device; and
the housing comprises a bezel around at least a portion of the first opening to wrap around at least the portion of the display screen when the portable electronic device is disposed in the housing.

11. The case of claim 10, wherein the housing further comprises at least one third opening at one or more positions that correspond to control elements of the portable electronic device when the portable electronic device is disposed in the housing.

12. A system comprising:
the case of claim 1; and
a portable electronic device disposed in the case.

13. The system of claim 12, wherein the portable electronic device is a mobile phone.

14. The system of claim 12, wherein the portable electronic device is a tablet computer.

15. A case for a portable electronic device having a display screen on a front of the portable electronic device and a camera, the case comprising:
a housing having a shape fitted at least in part to a shape of at least a portion of an exterior of the portable electronic device and arranged to receive and hold the portable electronic device, the housing comprising:
a first opening in a front surface of the housing to correspond to a position of the display screen on the front of the portable electronic device when the portable electronic device is disposed in the housing;
a housing back surface comprising a first portion that is arranged to be located a first distance from a device back surface of the portable electronic device when the portable electronic device is disposed in the housing and further comprising a second portion that is arranged to be located a second distance from the device back surface when the portable electronic device is disposed in the housing, the second distance being greater than the first distance, the housing back surface being a continuous between the first portion and the second portion;
a top surface; and
at least one second opening in the top surface; and
at least one optical element disposed within the second portion of the housing back surface of the housing and positioned to convey light between the at least one second opening in the top surface of the housing and the camera of the portable electronic device when the portable electronic device is disposed in the housing, the at least one optical element comprising at least one light-redirecting component arranged in the second portion so as to redirect light entering the at least one second opening in the top surface,
wherein:
the housing further comprises one or more mounting elements, disposed inside the second portion, to provide a mount that is angled with respect to the device back surface of the portable electronic device and angled with respect to the top surface; and
the at least one light-redirecting component is mounted on the one or more mounting elements so as to be mounted angled with respect to the device back surface of the portable electronic device and angled with respect to the protrusion top surface.

16. A method of operating a portable electronic device disposed in a case, wherein the portable electronic device comprises a display screen on a front of the portable electronic device and a camera disposed on a back of the portable electronic device, wherein the case comprises a housing having a shape fitted at least in part to a shape of at least a portion of an exterior of the portable electronic device and arranged to receive and hold the at least the portion of the exterior of the portable electronic device, the housing comprising a first opening on a front surface of the housing to correspond to a position of the display screen on the front of the portable electronic device, the housing further comprising a protrusion extending from a back surface of the housing and integrated with the housing, the protrusion having a protrusion top surface, the protrusion being arranged to extend away from a back of the portable electronic device when the portable electronic device is disposed in the housing, the housing further comprising at least one second opening in the protrusion top surface of the protrusion from the housing, the case further comprising at least one optical element, disposed within the protrusion from the housing, to convey light between the at least one second opening in the protrusion top surface of the protrusion from the housing and the camera disposed on the back of the portable electronic device, the at least one optical element comprising at least one light-redirecting component arranged in the protrusion so as to redirect light entering the at least one second opening in the protrusion top surface of the protrusion to the camera, wherein the protrusion comprises one or more mounting elements, disposed inside the protrusion, to provide a mount that is angled with respect to the back of the portable electronic device and angled with respect to the protrusion top surface, and wherein the at least one light-redirecting component is mounted on the one or more mounting elements so as to be mounted angled with respect to the back of the portable electronic device and angled with respect to the protrusion top surface, the method comprising:
holding the portable electronic device disposed in the case such that the display screen of the portable electronic device is facing in an up direction, the at least one second opening in the protrusion top surface of the protrusion is facing in a forward direction, and the camera on the back of the portable electronic device is facing in a down direction, wherein the forward direction is a direction from the protrusion top surface toward an object; and
operating the portable electronic device to capture an image, using the camera, of the object toward which the at least one second opening is facing while holding the portable electronic device such that the camera is facing in the down direction, such that light is conveyed to the camera from the at least one second opening by the at least one optical element of the case.

17. The method of claim 16, wherein operating the portable electronic device comprises operating one or more controls on the front of the portable electronic device.

18. The method of claim 17, wherein operating the one or more controls on the front of the portable electronic device comprises operating one or more controls via the display screen of the portable electronic device.

* * * * *